Dec. 28, 1954  W. J. CHIEVITZ  2,698,090
MOUNTING MEANS FOR MAGNETIC PLUGS
Filed June 11, 1951
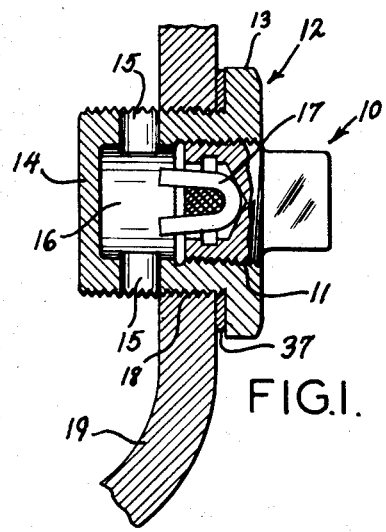
FIG.1.
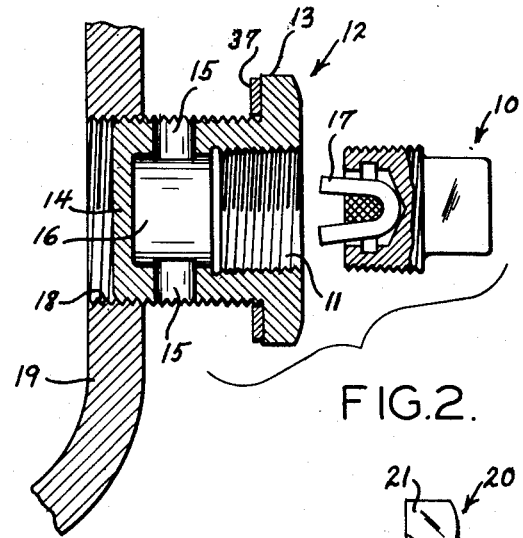
FIG.2.
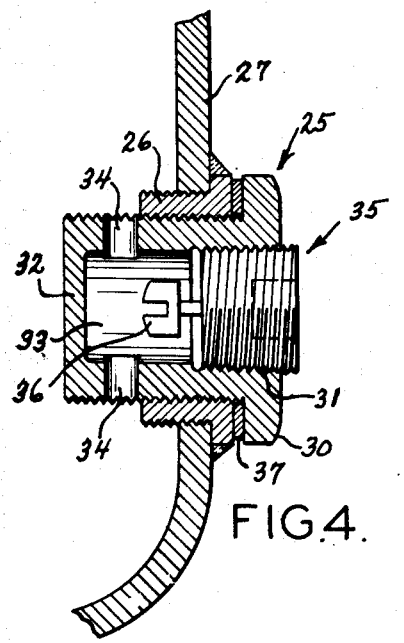
FIG.4.
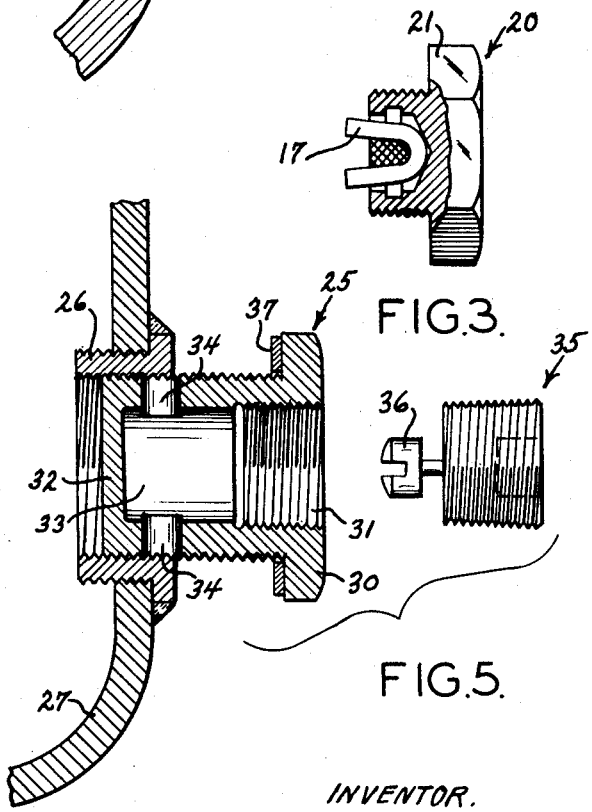
FIG.3.
FIG.5.
INVENTOR.
WILLIAM J. CHIEVITZ
BY Carr & Carr & Gravely
HIS ATTORNEYS.

United States Patent Office 2,698,090
Patented Dec. 28, 1954

2,698,090

MOUNTING MEANS FOR MAGNETIC PLUGS

William J. Chievitz, Canton, Ohio, assignor to The Timken Roller Bearing Company, Canton, Ohio, a corporation of Ohio Application June 11, 1951, Serial No. 230,996

3 Claims. (Cl. 210—1.5)

This invention relates to mounting means for magnetic plugs employed in connection with lubricant containing casings, and more particularly to plug mounting means for lubricating systems of machines, engines and the like.

It is an important object to improve upon the mounting of magnetic plugs for attracting the magnetic particles carried along with the lubricant, thereby removing such harmful substances and preventing or reducing damage to the bearings or other wearing parts of machines, engines and the like.

It is also an important object of this invention to provide magnetic plug mounting means which will permit removal of the magnetic plug for inspection and cleaning, without necessitating the drainage of the lubricant from the casing.

It is a further object of the present invention to provide mounting means for magnetic plugs, in which the mounting means is adapted to receive any of the magnetic plug devices which are commercially available.

The present invention consists in the combination of a hollow mounting means or adapter adjustable in an opening in a lubricant containing casing, the adapter being formed with an inner closure end having an adjacent port or ports and an open exterior flanged end for locating the adapter in the wall opening; and a magnetic plug removably disposed in the exterior open end of the adapter.

The invention further consists in the elements, parts, and combination of elements and parts hereinafter described in connection with the drawings, wherein:

Fig. 1 is a sectional view through an adapter and magnetic plug assembly mounted in a lubricant containing casing wall opening, the casing wall being shown in fragmentary section only;

Fig. 2 is a sectional view similar to that of Fig. 1, but showing the adapter means in its outwardly adjusted position and the magnetic plug removed from the adapter;

Fig. 3 is a view of a modified magnetic plug of hex head type, a portion being shown in section;

Fig. 4 is a view similar to Fig. 1, showing a modified mounting means and magnetic plug provided in connection with an auxiliary sleeve carried by the casing wall; and Fig. 5 is a view of the mounting means and magnetic plug shown in Fig. 4, but with the magnetic plug removed and the mounting means therefor outwardly adjusted in the casing wall sleeve.

Referring now to Figs. 1 and 2, one preferred form of the present invention comprises the magnetic plug 10 mounted in the exterior open end 11 of the mounting means 12. The mounting means 12 is formed with an exterior flange 13 and an inner closed end 14 having ports 15 located in the side wall of the mounting means adjacent the inner closed end 14 thereof. The ports 15 communicate with the hollow interior or chamber 16 of the mounting means 12, so that lubricant flowing into this chamber 16 by way of ports 15 will pass within the magnetic field or influence of the permanent magnetic element 17 carried by the magnetic plug 10.

The assembled mounting means 12 and magnetic plug 10 is shown in an opening 18 of a lubricant containing casing, the casing being shown in fragmentary section at 19. It should be understood that the casing 19 may consist of a part of an engine crank case, a lubricant conduit, or other wall means defining a flow path for a lubricant or containing a lubricant to direct or confine its movement, whether of a continuous or intermittent character.

The position of the mounting means and magnetic plug shown in Fig. 1 illustrates the normal operative position of the magnetic plug 10. On the other hand, in Fig. 2, the mounting means 12 is shown in its outwardly adjusted position relative to the opening 18 in the casing 19 so that the closed inner end 14 is positioned substantially in the opening 18 to act as a plug or closure for the opening to prevent escape of lubricant. The magnetic plug 10 can safely be removed from the mounting means 12 for inspection and cleaning, when the mounting means 12 is adjusted to the outward position shown in Fig. 2.

The advantage of the mounting means resides in the provision of the inner closure wall 14 which acts as a substitute plug or closure for the casing opening 18 when the magnetic plug 10 is removed. Heretofore, magnetic plugs have been mounted directly in a lubricant casing wall opening so that removal of the magnetic plug leaves the casing wall open and unprotected, and more often means that the casing must be drained and then refilled.

In Fig. 3, there has been shown a modified magnetic plug 20 having the same permanent magnetic means 17, as in the plug 10 of Fig. 1, disposed in a body formed with a hex head 21. This form of magnetic plug is commercially available and differs from the magnetic plug 10 of Fig. 2 only in the formation of the hex head 21.

Turning now to Fig. 4 for further preferred modifications, the mounting means 25 for a magnetic plug is threadedly carried in a mounting sleeve 26 fixed in the wall 27 of the lubricant casing. In this form of the invention, the casing 27 is of thin walled character and illustrates the usefulness of providing the auxiliary mounting sleeve 26. The auxiliary sleeve 26 provides the necessary axial support for the mounting means 25. The mounting means is formed with a flange 30 adjacent the outer open end 31 thereof, and a closed inner end wall 32 for the hollow interior chamber 33. This chamber communicates with the lubricant casing by way of ports 34 formed in the mounting means adjacent the closed inner end 32 thereof. A magnetic plug 35 is removably threaded in the open end 31 of the means 25, said plug 35 being characteristic of the Allenhead type which is provided with a projecting magnetic element 36.

With reference to Fig. 5, the mounting means 25 has been shown in its outwardly adjusted position relative to the auxiliary mounting sleeve 26 to illustrate the action of the closed inner wall 32 as a plug or closure for the opening in the auxiliary mounting sleeve 26. In this outwardly adjusted position of the mounting means 25, the magnetic plug means 35 can be removed, as shown, without danger of the escape of lubricant from the casing.

The presently preferred forms of the invention are believed to illustrate the principal advantage in the provision of a mounting means for magnetic plugs. The important consideration is to provide a mounting means which may be inwardly adjusted in a casing wall opening to permit the magnetic plug to be exposed to the lubricant in the casing, and to be adjusted outwardly of the casing opening to close off the opening and prevent escape or loss of lubricant during the times when the magnetic plug must be removed for inspection or cleaning. It is also important to be able to locate the mounting means in the casing wall so that the magnetic plug may be brought into communication with the lubricant. Such an indicator means or locator is found in the provision of the exterior flange on the mounting means. This flange, when it is adjusted inwardly adjacent the casing wall, as in Fig. 1, or adjacent the exposed end of the auxiliary mounting sleeve 26, as in Fig. 4, locates the position of the port or ports for establishing communication between the interior of the casing and the interior of the mounting means so that lubricant may flow through the mounting means within the influence of the magnetic plug.

The present disclosure illustrates the threaded mounting of the mounting means 12 and 25 and the magnetic plugs 10, 20 and 35, but it should be understood that there may be other ways of mounting these parts without affecting their utility. Since the mounting means 12 or 25 is located in its inwardly adjusted position (Figs. 1 and 4) most of the time, a washer 37 may be used to prevent leakage.

Reference has been made to the provision of ports 15 formed in the mounting means 12 and ports 34 formed in the modified mounting means 25, to provide for the flow of lubricant through the internal chamber of the mounting means and within the magnetic field of the plug. While the present disclosure shows these ports 15 and 34 to be of circular form, it is obvious that they may be of any other suitable form or shape to accomplish the purpose herein stated.

While the present invention has been illustrated and described in connection with certain preferred forms, it should be clearly understood that certain changes or modifications may be made without departing from the spirit or scope of the appended claims.

What I claim is:

1. The combination of a magnetic plug and plug mounting adapter for a lubricant containing casing comprising a magnetic plug for the casing, said plug carrying a permanent magnet for exposure to the lubricant to attract magnetic particles moved by the lubricant, and an adjustable mounting adapter in the casing for said plug, said adapter having a hollow interior open to the casing in an inwardly adjusted position and an inner imperforate wall closing the interior of said casing to the hollow adapter in an outwardly adjusted position.

2. The combination of a magnetic plug and plug mounting for a lubricant containing casing comprising a plug mounting adapter having a hollow body open at one end, closed at the opposite end and having an opening to the interior thereof intermediate said ends; and a magnetic plug disposed in the open end of said hollow body for exposure to lubricant in the body, said adapter being adjustable inwardly of the casing to locate said intermediate body opening inwardly of the casing for lubricant flow thereinto and adjustable outwardly of the casing to locate said intermediate body opening beyond the lubricant in the casing.

3. The combination of a magnetic plug and plug mounting adapter for an opening in a lubricant containing casing comprising a magnetic plug having a permanent magnetic element for attracting magnetic particles in the lubricant, and an adapter for said plug formed with a hollow body having an inner closed end and adjacent ports, the hollow body receiving said plug with its magnetic element inwardly of the hollow body, said adapter being adjustable inwardly of the casing opening with said ports exposed to the lubricant for flooding the interior thereof, and adjustable outwardly to position said inner closed end across the casing opening as a plug to prevent loss of lubricant from the casing.

References Cited in the file of this patent

UNITED STATES PATENTS

| Number | Name | Date |
| --- | --- | --- |
| Re. 20,291 | Bock | Mar. 9, 1937 |
| 1,320,624 | Keun | Nov. 4, 1919 |
| 1,720,380 | Schulze | July 9, 1929 |
| 1,806,001 | Simms et al. | May 19, 1931 |
| 1,862,916 | Weymouth et al. | June 14, 1932 |
| 2,345,029 | Brooks | Mar. 28, 1944 |
| 2,358,612 | Acker | Sept. 19, 1944 |
| 2,471,069 | Le Clair | May 24, 1949 |
| 2,521,347 | Davis | Sept. 5, 1950 |
| 2,529,398 | Krieck | Nov. 7, 1950 |
| 2,529,580 | Walton | Nov. 14, 1950 |